United States Patent [19]
Tate

[11] Patent Number: 5,685,918
[45] Date of Patent: Nov. 11, 1997

[54] COMPOSITION FOR REMOVING SCALE

[75] Inventor: Robert D. Tate, Lafayette, La.

[73] Assignee: Ambar, Inc., Lafayette, La.

[21] Appl. No.: 473,202

[22] Filed: Jun. 7, 1995

Related U.S. Application Data

[62] Division of Ser. No. 282,883, Jul. 29, 1994, abandoned.

[51] Int. Cl.[6] .................................................. C23G 1/06
[52] U.S. Cl. .................. 134/3; 134/22.13; 134/22.14; 134/22.17; 134/22.19; 134/25.1; 134/41; 210/698; 252/82; 252/180
[58] Field of Search ....................... 134/3, 2, 22.13, 134/22.14, 22.17, 22.19, 25.1, 41; 252/80, 82, 180, 181; 210/698

[56] References Cited

U.S. PATENT DOCUMENTS

| | | | |
|---|---|---|---|
| 4,030,548 | 6/1977 | Richardson et al. | 166/279 |
| 4,215,000 | 7/1980 | De Jong et al. | 252/8.55 B |
| 4,288,333 | 9/1981 | van Zon et al. | 252/8.55 B |
| 4,708,805 | 11/1987 | Muhala | 210/698 |
| 4,710,303 | 12/1987 | Emmons | 210/698 |
| 4,762,638 | 8/1988 | Dollman et al. | 252/135 |
| 4,898,677 | 2/1990 | Brase | 210/710 |
| 4,913,823 | 4/1990 | Lipinski et al. | 210/699 |
| 4,936,987 | 6/1990 | Persinski et al. | 210/699 |
| 4,973,201 | 11/1990 | Paul et al. | 405/264 |
| 4,980,077 | 12/1990 | Morris et al. | 252/82 |
| 4,992,182 | 2/1991 | Kalfayan et al. | 252/8.55 B |
| 5,026,481 | 6/1991 | Paul et al. | 210/638 |
| 5,032,280 | 7/1991 | Paul et al. | 210/643 |
| 5,049,297 | 9/1991 | Morris et al. | 252/80 |
| 5,051,197 | 9/1991 | Kalfayan et al. | 252/8.55 B |
| 5,059,333 | 10/1991 | Hen | 252/8.552 |
| 5,084,105 | 1/1992 | Morris et al. | 134/3 |
| 5,085,709 | 2/1992 | Morris et al. | 134/3 |
| 5,087,371 | 2/1992 | Paul et al. | 252/82 |
| 5,111,887 | 5/1992 | Morris et al. | 166/312 |
| 5,116,513 | 5/1992 | Koskan et al. | 210/698 |
| 5,146,988 | 9/1992 | Paul | 166/312 |
| 5,151,196 | 9/1992 | Paul et al. | 210/712 |
| 5,183,112 | 2/1993 | Paul et al. | 166/312 |
| 5,190,656 | 3/1993 | Paul et al. | 210/643 |
| 5,200,117 | 4/1993 | Morris et al. | 252/626 |
| 5,234,602 | 8/1993 | Morris et al. | 210/698 |
| 5,256,253 | 10/1993 | Zidovec et al. | 162/164.6 |
| 5,259,980 | 11/1993 | Morris et al. | 252/82 |
| 5,282,995 | 2/1994 | Paul et al. | 252/80 |
| 5,342,537 | 8/1994 | Conville et al. | 252/135 |
| 5,393,456 | 2/1995 | Perez et al. | 252/180 |

FOREIGN PATENT DOCUMENTS

WO 90/11972  10/1990  WIPO.

*Primary Examiner*—Peter A. Hruskoci
*Attorney, Agent, or Firm*—Arnold, White & Durkee

[57] ABSTRACT

Alkaline earth metal scales, particularly barium sulfate and strontium sulfate, and silica-based scales, particularly potassium fluorosilicate, are removed from industrial processing equipment, tubular goods, and other scaled materials with a composition comprising sufficient potassium base to provide an overall system pH of between about 12.0 to about 14.0, a polyaminocarboxylic acid, preferably EDTA, a hydroxy-carboxylic acid synergist, a pH buffering agent, a wetting agent, and optionally a sodium base.

12 Claims, No Drawings

5,685,918

COMPOSITION FOR REMOVING SCALE

This application is a divisional application under 37 C.F.R. §1.60 of application Ser. No. 08/282,883, filed Jul. 29, 1994, now abandoned.

BACKGROUND OF THE INVENTION

Scales are a problem in the production of oil. Effluents, such as water containing alkaline earth metal cations, such as barium, strontium, calcium, and magnesium, along with anions, such as sulfate, bicarbonate and carbonate, are often encountered in producing fields. When combinations of these anions and cations are present in sufficient concentrations, precipitation occurs, forming water insoluble scales. These water insoluble scales are otherwise known as alkaline earth metal scales. Some alkaline earth metal scales are calcium carbonate, barium sulfate, and strontium sulfate.

Sometimes, in oil-producing formations, silica-based scales are also formed. Like the alkaline earth metal scales, these scales are water-borne and highly insoluble. The most frequently encountered silica-based scale is potassium fluorosilicate.

While some scales are amenable to acid treatment, such as hydrochloric acid and hydrofluoric acid (otherwise known as "mud acid"), other scales such as barium sulfate, strontium sulfate, and potassium fluorosilicate are difficult, to impossible to dissolve or break up. These scales can precipitate out in a variety of places, such as in the reservoir, or producing formation, of a production well. They may form in the tubulars of a production well, as well as in pipelines, heater treaters, or other equipment downstream from the wellhead. Scales may also form in injection wells, in water flood plants, in filters, or anywhere various waters come together.

While alkaline earth metal scales and silica-based scales have been problematic in oil production, radioactive scales have become a very expensive problem. Naturally occurring radioactive material ("NORM"), such as the radium isotopes 226 and 228, have a strong affinity for these scales. As scale begins to form on tubing, as well as on produced sand or other particles in the well, the radium isotopes 226 and 228 become entrained within the scale matrix. Therefore, produced or removed solids from wells may exceed radiation levels set forth by EPA for disposal of nonhazardous oil field waste ("NOW").

While natural production of water and fluids from a well bore may contain the radium isotopes 226 and 228, these isotopes are present at such small concentrations that they do not pose a radiation problem. Radiation only becomes a problem when these isotopes become concentrated, as in scale deposits.

Because scales such as barium sulfate, strontium sulfate and potassium fluorosilicate are so resistant to dissolution, the traditional means of cleaning tubulars, pipelines, heater treaters, etc. has been to physically remove the scales. However, upon removal of the scale, the operator may have large volumes of solids contaminated with radioactive material. Currently, oil production companies and others have large inventories of such solids containing alkaline earth metal scales with NORM entrained throughout. Present disposal methods and/or regulations require expensive remedies.

While commercial chemicals exist that are slowly effective for partially dissolving alkaline earth metal scales, none of the currently available chemicals produce highly efficient or rapid rates of scale dissolution, particularly with barium sulfate and strontium sulfate. Furthermore, current methods for removing silica-based scales from oil formations, such as pure base treatment, are only minimally effective due to the highly destructive action of the chemicals to the oil formation itself.

What is needed is a chemical which quickly and effectively facilitates dissolution of alkaline earth metal scales and removal of silica-based scales. If the chemical is used down-hole, high production can be restored to a well. If the chemical is used for surface treatment of contaminated scale, the radium isotopes entrained in the scale can be returned into solution and the solids, such as sand and other material, can be rendered non-hazardous oil field waste for conventional waste disposal.

SUMMARY OF THE INVENTION

The present invention is directed to novel scale-removing compositions and methods of their use. The compositions of the present invention are useful in dissolving alkaline earth metal scale deposits and removing silica-based scale deposits, at markedly higher speeds and efficiencies than prior scale-removing compositions. The present invention is particularly useful in removing and/or dissolving scale deposits formed in industrial process units and equipment as well as dissolving scale materials which have been removed and collected from such operations. The advantages of the present invention are especially appreciated in oil-related applications such as down-hole drilling and oil recovery operations from subterranean formations. For example, the compositions of the present invention may be applied to well units, boilers, heat exchanger, storage vessels, valves, pipelines, tubular goods, and other processing equipment exposed to scale-forming conditions in the oil field and elsewhere. In addition, the compositions of the present invention may be applied to scaled materials such as sand collected from oil processing equipment.

Typically, scale deposits form on surfaces exposed to mineral-containing effluents such as water. The minerals usually comprise cations such as potassium, barium, strontium, calcium and magnesium in combination with sulfate, bicarbonate, or carbonate anions. In some underground formations, silica-based anionic moieties are also encountered. In sufficient concentration, these cationic and anionic moieties are precipitated from solution and deposited as water-insoluble scale.

As these scales are formed, naturally occurring radioactive materials ("NORM") present in the water, such as radium 226 and 228 isotopes, may also become entrained in the mineral deposits. These radioactive scales are commonly associated with oil field operations.

According to the present invention, scale deposits such as those described above are effectively dissolved and/or removed by contact with an aqueous solvent of a polyaminocarboxylic acid chelant in an highly alkaline environment produced by the addition of a potassium base wherein a pH buffering agent, an hydroxycarboxylic acid synergist, a wetting agent, and optionally a sodium base are included in the solvent to accelerate the scale removal process. The buffering agent, synergist, wetting agent, and optional sodium base of the present invention permit intimate contact between the solvent and the scale such that the chelating agent is allowed to remove and sequester the cationic components of the mineral deposits quickly and efficiently. Thus, the present invention permits scale dissolution and/or removal at rates much faster than heretofore possible.

DETAILED DESCRIPTION OF THE INVENTION

In forming the scale-dissolving compositions of the present invention, it is preferred that the chemical agents be combined in sufficient concentration to form an undiluted, minimally active stock solution. Such a stock solution is preferred since it facilitates handling and storage of the reagent mixture until such time as the composition is required for scale-cleaning treatment. Thereafter, the stock solution may be rendered "active" upon demand simply by diluting a measured volume of the stock solution with equal parts by volume of water. By "active" it is meant that the diluted stock solution would fully embody all of the advantages of the present invention.

In preparing the stock solution, the polyaminocarboxylic acid chelating agent preferably comprises ethylenediaminetetraacetic acid (EDTA). Sufficient chelant should be added such that the chelant concentration in the stock solution is in the range of about 0.5M to about 2.0M. This range provides for maximum efficiency and economy of the scale-dissolving compositions produced in accordance with the present invention.

In addition to the chelant, the present scale-dissolving compositions also contain a potassium base, preferably potassium hydroxide, which is used to create an alkaline environment for the stock solution in the range of about 12.0 to about 14.0. The combination of the potassium base with the acid chelant results in the formation of stable potassium salts.

In terms of weight percent, the amount of potassium hydroxide (KOH) required to provide a stock solution pH between 12.0 and 14.0 may range between about 45% to about 55% of the final stock solution weight. Furthermore, in the interest of economy, it is preferred that technical grade potassium hydroxide solutions be used in the scale-dissolving compositions of the present invention. In particular, potassium hydroxide reagents comprising approximately 45% KOH are preferred. Such reagents are readily available commercially.

In addition to the potassium base, a sodium base, preferably technical grade sodium hydroxide (NaOH), may be added to the compositions of the present invention for use in treatment of silica-based scales, such as potassium fluorosilicate, which typically form in underground reservoirs. When used in accordance with the present invention, the sodium hydroxide aids in the production of a potassium fluorosilicate slurry which does not degrade or otherwise destroy the surrounding subterranean formation. Thus, the slurry may be pumped out of down-hole sites for further treatment by any means known to those skilled in the art. Preferably, the sodium base is added in sufficient quantity to comprise between about 4% to about 6% by weight of the final stock solution, and preferably 5% by weight.

As a carrier for the chemicals of the present invention, water is preferably added in sufficient quantity to comprise between about 4% to about 5% by weight of the final stock solution. Generally, addition of water in excess of 5% is undesirable since it may result in premature "activation" of the scale-dissolving composition, as described above.

Another constituent of the scale-dissolving compositions of the present invention is the pH buffering agent. The pH buffering agent preferably comprises a potassium salt, and more preferably potassium carbonate. The additional potassium cations furnished by the reagent buffer the alkaline chelant solution according to the common ion principle of buffering. As a result of the buffering action provided by the potassium salt, the present invention may be used in both acidic and alkaline environments without jeopardizing the overall alkalinity of the scale-dissolving composition.

It is preferred that the pH buffering agent be added in sufficient concentration to comprise between about 4% to about 6% by weight of the final stock solution. Furthermore, it is preferred that the potassium salt be added in anhydrous form to prevent unnecessary dilution of the stock scale-dissolving composition.

In addition to the pH buffering agent, a synergist comprised of a hydroxycarboxylic acid, or salt thereof, is added to the scale-dissolving compositions of the present invention. While not desiring to be bound to any particular theory, it is believed that the hydroxycarboxylic-based synergist aids in chelation of divalent cations such as barium, strontium, calcium, and magnesium. The synergists of the present invention are also particularly well-suited for use in highly alkaline environments, in comparison to other organic synergists, permitting faster rates of scale dissolution than heretofore achievable.

Within the class of hydroxycarboxylic-based synergists, sodium glucoheptonate is preferred, owing to its relative abundance and inexpensive cost. According to the present invention, the sodium glucoheptonate is preferably added in an amount sufficient to comprise between about 10% to about 15% by weight of the final stock solution, and preferably around 13% by weight of the final stock solution. Moreover, in forming compositions for use in the treatment of alkaline earth metal scales, it is preferred that the sodium glucoheptonate be rendered "optically inactive" prior to its introduction to the scale-cleaning stock solution. By "optically inactive" it is meant that both the "A" and "B" isomers of the sodium glucoheptonate are selectively removed. However, the "B" isomer of sodium glucoheptonate is preferably maintained in compositions used for the treatment of silica-based scales. However, the present invention is not limited to sodium glucoheptonate synergists of such form.

To improve the accessibility of the compositions of the present invention to scaled surfaces, a wetting agent may also be added to the stock solution. The wetting agent may comprise a commercially available surfactant or other synthesized reagent containing methanol and sodium chloride. Such wetting agents are capable of improving ionic exchange between the aqueous compositions of the present invention and scaled surfaces containing non-polar, organic coatings, such as oil. Thus, wetting agent additives are especially preferred in compositions used to treat oil field scales.

Of the commercially available surfactants, Miranol Jem®, a proprietary product of Rhone-Poulenc Chemical Company, is preferred due to its micellar structure and high efficacy in promoting scale dissolution in oily environments. The surfactant is preferably added in sufficient quantity to comprise between about 0.5% to about 1.5% of the total weight of the stock solution.

Upon combination of the polyaminocarboxylic acid chelant, potassium base, pH buffering agent, synergist, wetting agent, and optionally a sodium base in accordance with the present invention, the composition may be stored until such time as the stock solution is required for scale-removal treatment. Prior to treatment, the composition may be "activated" by diluting a measured volume of the solution with equal parts by volume of water. Of course, further dilution may be desired for economy, depending on the particular treatment parameters such as the degree of scale removal required.

The "activated" compositions of the present invention may be applied to processing equipment, tubular goods, and other products to dissolve and/or remove scale deposits. The "activated" compositions may also be applied to scaled materials such as sand recovered from oil processing equipment. Presently, some sands are precluded from landfill disposal due to the presence of radioactive isotopes (i.e., radium 226 and 228) in the scale matrix. By treating these scaled sands with the compositions of the present invention, the scale deposits may be dissolved or otherwise removed and the radioactive isotopes liberated into solution, leaving clean, non-radioactive sand for disposal in conventional landfill sites. The resultant liquid or slurry may then be disposed of as conventional produced or treatment fluids.

Prior to above-ground scale-dissolution treatment, it is preferred that the composition be heated to between approximately 140° F. to 200° F. Under these conditions, complete scale dissolution or solubilization is typically achieved in between one to 200 minutes. Of course, mechanical agitation of the solution and/or the scaled material will tend to promote scale dissolution or solubilization and reduce the overall treatment time. Applicant incorporates by reference the copending application filed by Inventor Robert D. Tate on Jul. 29, 1994 titled "Method for Treating Scale" which describes particular treatment equipment which may be used to dissolve scale from oil field sands and other materials using the compositions of the present invention.

In subterranean scale-dissolution treatment, pre-heating is usually not required due to the high underground temperature and pressure. The treatment fluid may be placed in contact with the down-hole scale by any method generally used for a typical acid treatment. For example, the treatment fluid may be bull-headed, spotted with tubing, spotted with coiled tubing, etc.

Once the treatment fluid is in contact with the scale, it should not be left to simply sit static throughout the treatment. Periodically, the fluid should be agitated to allow fresh, unspent chemicals to contact the remaining mineral deposits to ensure maximum scale dissolution. Agitation may be accomplished simply by opening the well up and allowing some fluid to flow up through the tubing. At the other extreme, agitation may be provided by a recirculating coiled tubing jet wash which continually recirculates the treatment fluid across the scale.

The described cleaning procedure works equally well for scale contained in down-hole production equipment as well as scale that has formed in the reservoir. It is preferred that any down-hole treatment be performed over a 24 hour shut-in of the production line, with periodic agitation. However, depending on the amount of scale build-up, a shorter treatment time may be used.

We claim:

1. A method for removing silica-based scale deposits from processing equipment or scale-bearing sands comprising contacting the scale with an aqueous solution formed from a stock solution, said stock solution having sufficient potassium base to provide a stock solution pH of about 12.0 to about 14.0 and comprising a polyaminocarboxylic acid chelant or salt thereof in an amount sufficient to create a chelant concentration of about 0.5M to about 2.0M in the stock solution prior to dilution to create said aqueous solution, sodium glucoheptonate synergist comprising about 10% to about 15% of the weight of the said stock solution, a pH buffering agent in sufficient concentration to comprise about 4% to about 6% of the weight of said stock solution, and a wetting agent in sufficient quantity to comprise about 0.5% to about 1.5% of the weight of said stock solution.

2. The method of claim 1 wherein said silica-based scale is potassium fluorosilicate.

3. The method of claim 1 wherein said stock solution further comprises a sodium base in an amount between about 4% to about 6% weight.

4. The method of claim 1 wherein said processing equipment comprises industrial processing equipment.

5. The method of claim 1 wherein said processing equipment comprises oil field processing equipment.

6. The method of claim 1 wherein said processing equipment comprises tubular goods.

7. The method of claim 1 wherein said deposits are removed from scale-bearing sands.

8. A method for dissolving alkaline earth metal scale deposits from processing equipment or scale-bearing sands comprising contacting the scale with an aqueous solution formed from a stock solution, said stock solution having sufficient potassium base to provide a stock solution pH of about 12.0 to about 14.0 and comprising a polyaminocarboxylic acid chelant or salt thereof in an mount sufficient to create a chelant concentration of about 0.5M to about 2.0M in the stock solution prior to dilution to create said aqueous solution, a sodium glucoheptonate synergist comprising about 10% to about 15% of the weight of said stock solution, a pH buffering agent in sufficient concentration to comprise about 4% to about 6% by weight of said stock solution and a wetting agent in sufficient quantity to comprise about 0.5% to about 1.5% of the weight of said stock solution.

9. The method of claim 8 wherein said processing equipment comprises industrial processing equipment.

10. The method of claim 8 wherein said processing equipment comprises oil field processing equipment.

11. The method of claim 8 wherein said processing equipment comprises tubular goods.

12. The method of claim 8 wherein said deposits are dissolved from scale-bearing sands.

* * * * *